(12) United States Patent
Yamashita et al.

(10) Patent No.: US 9,635,300 B2
(45) Date of Patent: Apr. 25, 2017

(54) PHOTOELECTRIC CONVERTER, IMAGING SYSTEM, AND DRIVING METHOD OF PHOTOELECTRIC CONVERTER

(71) Applicant: CANON KABUSHIKI KAISHA, Tokyo (JP)

(72) Inventors: Takanori Yamashita, Hachioji (JP); Yoshikazu Yamazaki, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 92 days.

(21) Appl. No.: 14/688,819

(22) Filed: Apr. 16, 2015

(65) Prior Publication Data

US 2015/0304584 A1 Oct. 22, 2015

(30) Foreign Application Priority Data

Apr. 18, 2014 (JP) ................................. 2014-086686

(51) Int. Cl.
*H04N 5/378* (2011.01)
*H04N 5/369* (2011.01)
*H04N 5/357* (2011.01)

(52) U.S. Cl.
CPC .......... *H04N 5/378* (2013.01); *H04N 5/3577* (2013.01); *H04N 5/3698* (2013.01)

(58) Field of Classification Search
None
See application file for complete search history.

(56) References Cited

U.S. PATENT DOCUMENTS

| | | | |
|---|---|---|---|
| 6,818,877 B2 | 11/2004 | Boemler | |
| 2002/0024601 A1 | 2/2002 | Kaifu | |
| 2008/0258047 A1 | 10/2008 | Sakakibara | |
| 2008/0284891 A1 | 11/2008 | Hattori | |
| 2010/0328509 A1 | 12/2010 | Yamashita | |
| 2011/0013050 A1 | 1/2011 | Aruga | |
| 2012/0132786 A1 | 5/2012 | Mori | |

FOREIGN PATENT DOCUMENTS

GB 2423580 A 8/2006
JP H11-308531 A 11/1999

*Primary Examiner* — Stephen Coleman
(74) *Attorney, Agent, or Firm* — Canon U.S.A., Inc. IP Division

(57) ABSTRACT

An absolute value between a reset voltage to reset a signal line and a first voltage supplied from a signal source is smaller than an absolute value between the reset voltage and a second voltage supplied from the signal source.

11 Claims, 8 Drawing Sheets

PHOTOELECTRIC CONVERTER, IMAGING SYSTEM, AND DRIVING METHOD OF PHOTOELECTRIC CONVERTER

BACKGROUND OF THE INVENTION

Field of the Invention

The present invention relates to a photoelectric converter, an imaging system, and a driving method of the photoelectric converter.

Description of the Related Art

There are known imaging devices where amplifiers are connected to signal lines to read out signals from pixels. U.S. Pat. No. 6,818,877 (hereinafter "PTL 1") describes a configuration where multiple amplifiers for reading out signals from pixels are connected to a video bus, and also a pre-charge amplifier is provided to boost the potential of the video bus. The amplifier to read out signals from pixels is provided with a low-impedance amplifier to drop the potential of the video bus. After the pre-charge amplifier boosts the potential of the video bus, the amplifier to read out signals from pixels operates to drop the potential of the video bus.

However, in a case of operating such as described in PTL 1, a great (high) current flows between the video bus and the power source when boosting the potential of the video bus using the pre-charge amplifier and when dropping the potential of the video bus using the amplifier to read out signals from pixels. The potential of the video bus fluctuates greatly as a result, and the potential of the video bus may not converge by the point-in-time for sampling signals output to the video bus at a circuit downstream from the video bus. Accurate signal levels cannot be sampled, which leads to deterioration of image quality.

SUMMARY OF THE INVENTION

Provided is a photoelectric converter including: a signal source processing a signal generated at a photoelectric conversion unit; a signal line configured to receive signals output from the signal source; and a resetting unit configured to supply a reset voltage to the signal line. The signal source includes an amplifying transistor and a load which supplies current to the amplifying transistor, that are serially arrayed between a first node to which a first voltage is supplied and a second node to which a second voltage is supplied. The load is disposed at a side where the second voltage is supplied. An absolute value between the reset voltage and the first voltage is smaller than an absolute value between the reset voltage and the second voltage.

Also provided is a driving method of a photoelectric converter processing a signal generated at a photoelectric conversion unit. The photoelectric converter has a signal source including a photoelectric conversion unit, an amplifying transistor, and a load that supplies current to the amplifying transistor, in which the amplifying transistor and load are serially arrayed between a first node to which a first voltage is supplied and a second node to which a second voltage is supplied, the load being disposed at a side where the second voltage is supplied. The photoelectric converter also has a signal line configured to receive signals output from the signal source. The method includes resetting the signal line to a reset voltage prior to outputting signals to the signal line from the signal source. An absolute value between the reset voltage and the first voltage is smaller than an absolute value between the reset voltage and the second voltage.

Further features of the present invention will become apparent from the following description of exemplary embodiments with reference to the attached drawings.

DESCRIPTION OF THE EMBODIMENTS

First Embodiment

Figure 1:
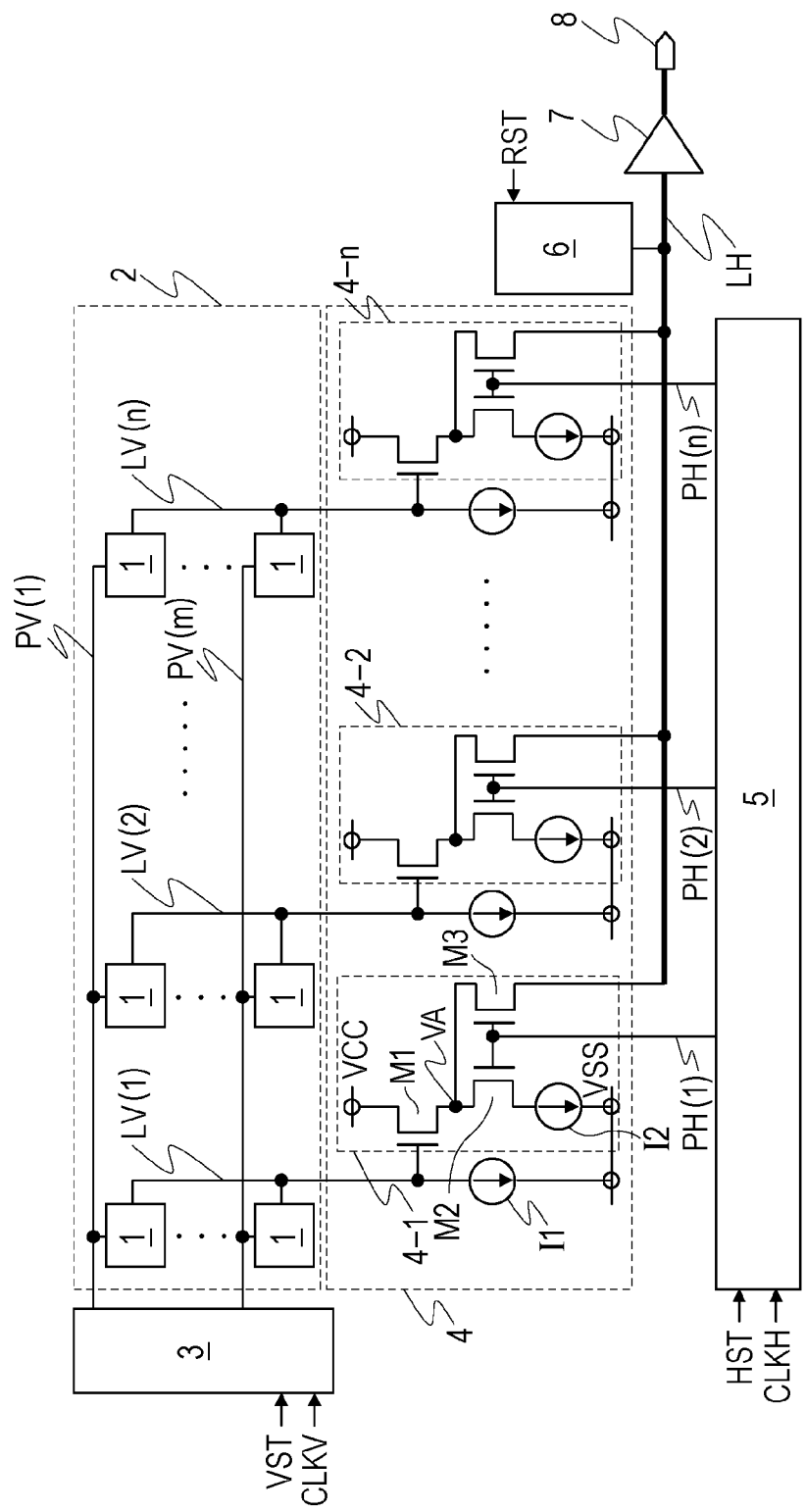
FIG. 1 is a block diagram illustrating a configuration example of a photoelectric converter according to a first embodiment.

FIG. 1 is a block diagram illustrating a configuration example of a photoelectric converter according to a first embodiment. The photoelectric converter includes a pixel array 2 which includes multiple pixels 1 arrayed in a matrix form, a line selecting unit 3 which selects the pixels 1 in increments of lines, and a signal processing unit 4 which processes signals output from the pixel array 2. The photoelectric converter further includes a column selecting unit 5 that selects a signal processing unit 4, a horizontal signal line LH that transmits signals output from the signal processing unit 4, an output buffer 7 that outputs signals output to the horizontal signal line LH, and a resetting unit 6 that resets the horizontal signal line LH. Signals output from the output buffer 7 are transmitted from an output node 8 to a circuit downstream.

The pixels 1 include photoelectric converting units, and may include, in addition to the photoelectric converting units, pixel amplifying units which output voltage signals in accordance with (to) charges generated at the photoelectric converting units. The pixels 1 in the same column are connected to the signal processing unit 4 via one of common vertical signal lines LV(1) through LV(n). The signal processing unit 4 includes column signal processing units 4-1 through 4-n, provided corresponding to each column of the pixel array 2. Here, n is a natural number, so in FIG. 1, the vertical signal line LV(n) and signal processing unit 4-n are both indicated to be situated at the n'th column from the left of the pixel array 2. In a case of collectively referring to vertical signal line LV(1) though LV(n) hereinafter, this will be written as LV.

The signal processing unit 4 according to the present embodiment includes a constant current source I1 that supplies electric current to the vertical signal line LV(1), and a buffer unit that receives input of signals from the pixels 1 and outputs voltage signals to the horizontal signal line LH. The buffer unit includes transistors M1 and M2 and a constant current source I2. One primary node (terminal) of the transistor M1 is connected to a first node which supplies a first voltage VCC, and the other primary node is connected to the horizontal signal line LH via a transistor M3. The transistor M3 performs (serves) a role as a selection transistor for selecting a buffer circuit. Upon the transistor M3 going on, the output of the buffer circuit (unit) is transmitted to the horizontal signal line LH. Upon the transistor M2 going on, the path between the other primary node of the transistor M1 and the constant current source I2 conducts, whereby the transistor M1 and constant current source I2 operate as a source follower circuit. In other words, the buffer circuit, according to the present embodiment, includes the transistor M1, which is an amplifying transistor, the constant current source I2, which is a load supplying current to the amplifying transistor, and the transistor M2. The transistor M2 is provided between the first node, to which the first voltage VCC is supplied, and a second node to which a second voltage VSS is supplied.

The line selecting unit 3 operates upon receiving a vertical start pulse VST and a vertical clock signal CLKV, and outputs signals PV(1) through PV(m) to control the pixels of each row of the pixel array 2, synchronous with the vertical clock signal CLKV. m is a natural number, and indicates being at the m'th row from the top of the pixel array 2 in FIG. 1.

The column selecting unit 5 operates upon receiving a horizontal start pulse HST and a horizontal clock signal CLKH, and outputs signals PH(1) through PH(n) for controlling the column signal processing units 4-1 through 4-n, synchronous with the horizontal clock signal CLKH. Signal PH(n) indicates being at the n'th column from the left in the pixel array 2 in FIG. 1.

Figure 2:
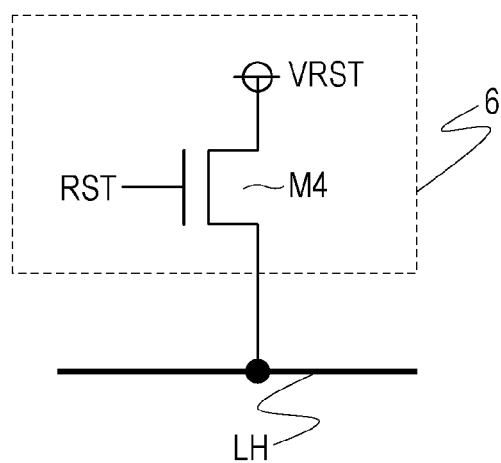
FIG. 2 is a diagram illustrating a configuration example of a reset unit according to the first embodiment.

FIG. 2 illustrates a configuration example of the resetting unit 6. The resetting unit 6 according to the present embodiment has a horizontal reset transistor M4 which has one primary node (terminal) connected to the horizontal signal line LH, and the other primary node (terminal) receiving reset voltage VRST. The horizontal reset transistor M4 is controlled by a signal RST provided to the control node (terminal). The reset voltage VRST is set such that the absolute value between the reset voltage VRST and the first voltage VCC is smaller than the absolute value between the reset voltage VRST and the second voltage VSS.

Figure 3:
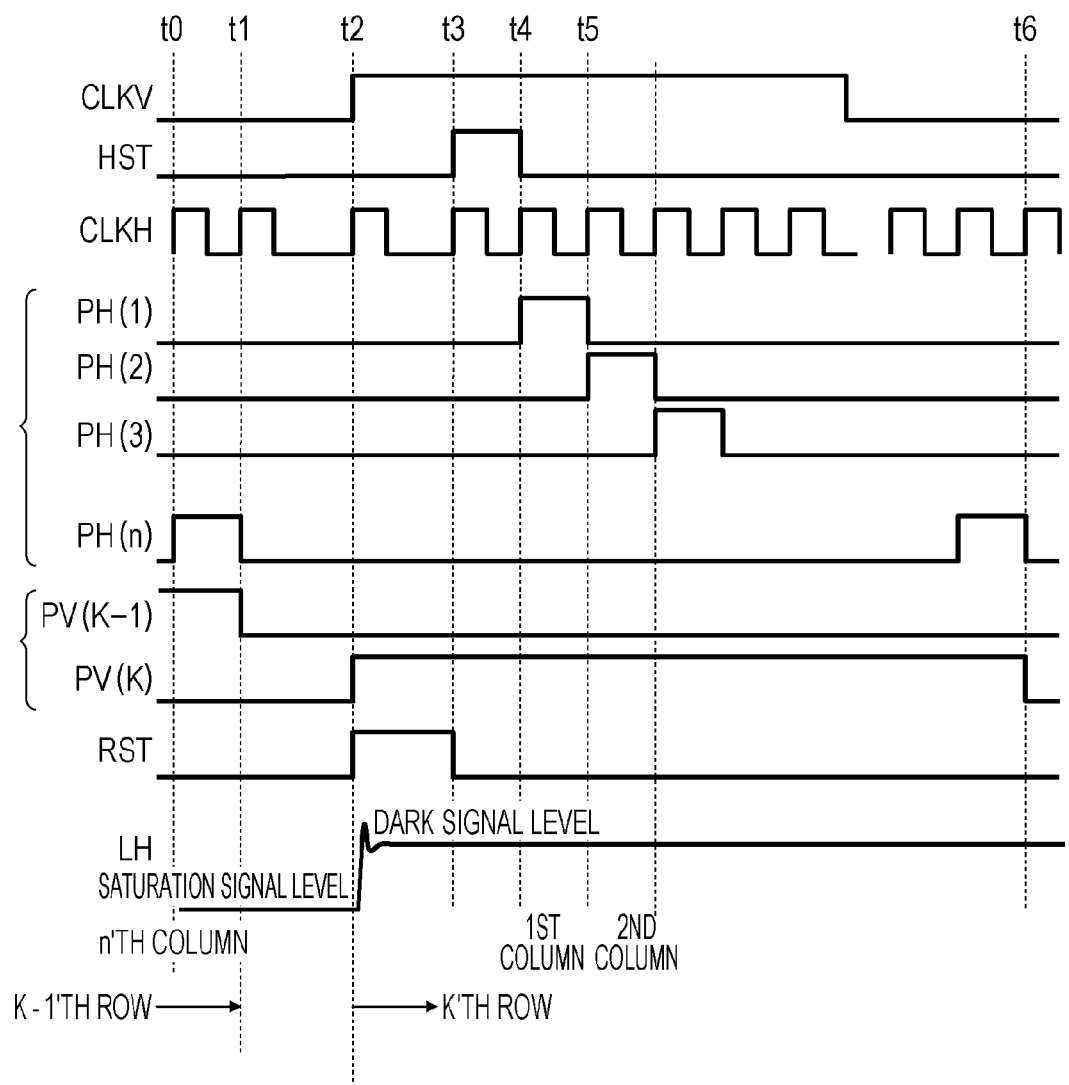
FIG. 3 is a timing chart for describing operations of the photoelectric converter according to the first embodiment.

Next, the operations of the photoelectric converter according to the present embodiment will be described. FIG. 3 is a timing chart for describing an example of the operations of the photoelectric converter. In the following description, the transistors go on when the signal received at the control node is at high level.

A period up to time (point-in-time) t1 is a period where signals relating to the pixels of (K−1)'th row of the pixel array 2 are output from the signal processing unit 4, and time t2 through time t6 is a period where signals relating to pixels of the K'th row of the pixel array 2 are output from the signal processing unit 4. K is an integer in the range of 2 to m.

At time t0, when the signal PH(n) goes to high level synchronously with the horizontal clock signal CLKH, the transistors M2 and M3 included in the column signal processing unit 4-n of the n'th column go on. Accordingly, the transistor M1 and the constant current source I2 operate as a source follower circuit, and the output of this source follower circuit is manifested on the horizontal signal line LH via the transistor M3. An assumption will be made here that the output at the pixel at the n'th column of the (K−1)'th row is saturation signal level.

At time t1, the signal PH(n) goes to low level, synchronously with the horizontal clock signal CLKH going to high level. At the same time t1, the signal PV(K−1) goes to low level, and accordingly the readout operation relating to the pixels for the (K−1)'th row ends.

Upon the vertical clock signal CLKV going to high level at time t2, the signal PV(K−1) shifts to the K'th row, and the signal PV(K) goes to high level. Accordingly, the operations of outputting signals from the pixels of the K'th row starts. The reset signal RST goes to high level synchronously with the horizontal clock signal CLKH going to high level at time t2. This resets the horizontal signal line LH in accordance with the reset voltage VRST. The potential of the horizontal signal line LH is maintained at the output of the previous row, so upon the horizontal signal line LH being reset at time t2, a high (great) current flows at the horizontal signal line LH. The great current flowing causes the potential of the horizontal signal line LH to fluctuate as well, and finally converge at dark signal level. Dark signal level is a signal level output from a pixel in a case where incident light is not entering the pixel. In a case where the pixel array 2 includes shielded pixels, in which the photoelectric conversion unit is shielded from incident light, the dark signal level is equivalent to the output of the shielded pixels. In the present example, this is a level closer to the first voltage VCC than the second voltage VSS. In the present embodiment, the reset voltage VRST is at the dark signal level.

After the potential of the horizontal signal line LH converges at the dark signal level between (from) time t2 to time t3, at time t3 the horizontal start pulse HST goes to high level synchronously with the horizontal clock signal CLKH. Subsequently, upon the horizontal clock signal CLKH going to high level at time t4, the horizontal start pulse HST is shifted to the next stage synchronously with this, so after time t4 the outputs of the column selecting unit 5 PH(1), PH(2), . . . PH(n) are sequentially output. FIG. 3 illustrates a case where signals relating to the pixels 1 of the K'th row all output dark signal level signals.

Upon scanning of the signal processing unit 4 by the column selecting unit 5 thus being completed, the signal PV(K) goes to low level at time t6, and the readout operation of signals relating to the pixels of the K'th row ends.

The reset voltage VRST is set such that the absolute value between the reset voltage VRST and the first voltage VCC is smaller than the absolute value between the reset voltage VRST and the second voltage VSS in the present embodiment, so signals can be accurately read from the signal processing unit 4. The reason for this will be described. First, the column signal processing units 4-1 through 4-n, which are signal sources, include a serially-arranged amplifying transistor and a load, between the first node to which the first voltage VCC is supplied and the second node to which the second voltage VSS is supplied. The reset voltage VRST is set such that the absolute value between the reset voltage VRST and the first voltage VCC is smaller than the absolute value between the reset voltage VRST and the second voltage VSS. Accordingly, if the signal first read out after having reset the horizontal signal line LH is of a signal level closer to the second voltage VSS than the reset voltage VRST, the amount of current flowing to drop the potential of the horizontal signal line LH is restricted by the constant current source I2. Thus, abrupt change in the potential of the horizontal signal line LH can be suppressed, so signals from the output buffer 7 can be accurately read out. On the other hand, even if the signal first read out after having reset the horizontal signal line LH is of a signal level closer to the first voltage VCC than the reset voltage VRST, the amount of current flowing to boost the potential of the horizontal signal line LH is not large. Accordingly, fluctuation of potential of the horizontal signal line LH can be suppressed, and consequently signals from the output buffer 7 can be accurately read out.

Conversely, in a case where the absolute value between the reset voltage VRST and the first voltage VCC is larger than the absolute value between the reset voltage VRST and the second voltage VSS, a large current may flow depending on the signal first read out after having reset the horizontal signal line LH. Specifically, there is concern that a high (great) current may flow in a case where a signal closer to the first voltage VCC than the reset voltage VRST is output from the signal processing unit 4 after resetting the horizontal signal line LH.

Figure 4:
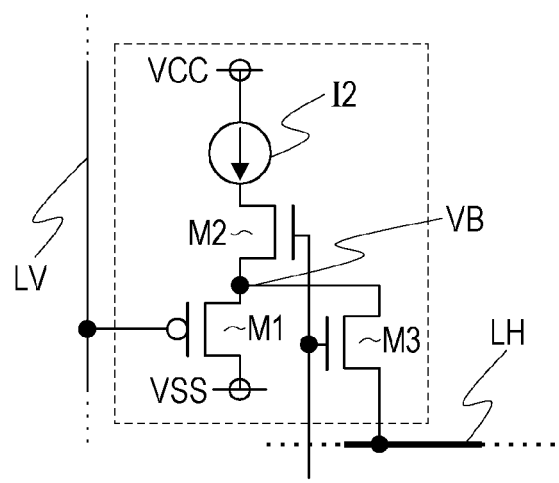
FIG. 4 is a diagram illustrating a configuration example of a signal source according to the first embodiment.

While the present embodiment has been described by way of an example where the transistor M1 is an n-channel metal-oxide semiconductor (NMOS) transistor, so as to have an NMOS source follower circuit, the transistor M1 may be a p-channel metal-oxide semiconductor (PMOS) transistor, so as to have a PMOS source follower circuit, as illustrated in FIG. 4. In this case, the voltage VSS is the first voltage and the voltage VCC is the second voltage, with the reset voltage VRST being set to a value closer to the voltage VSS than the voltage VCC.

While description has been made in the present embodiment focusing on the signal processing unit 4 and the horizontal signal line LH, the pixels 1 and the vertical signal line LV may be configured in the same way, or just one of the vertical signal line LV and the horizontal signal line LH may be configured this way. That is to say, while the present embodiment has been described with regard to the relationship between the column signal processing unit 4-1 through 4-n arrayed one-dimensionally, the present invention also holds with regard to the relationship between multiple pixels arrayed one dimensionally and the vertical signal line LV provided in common thereto.

Second Embodiment

Figure 5:
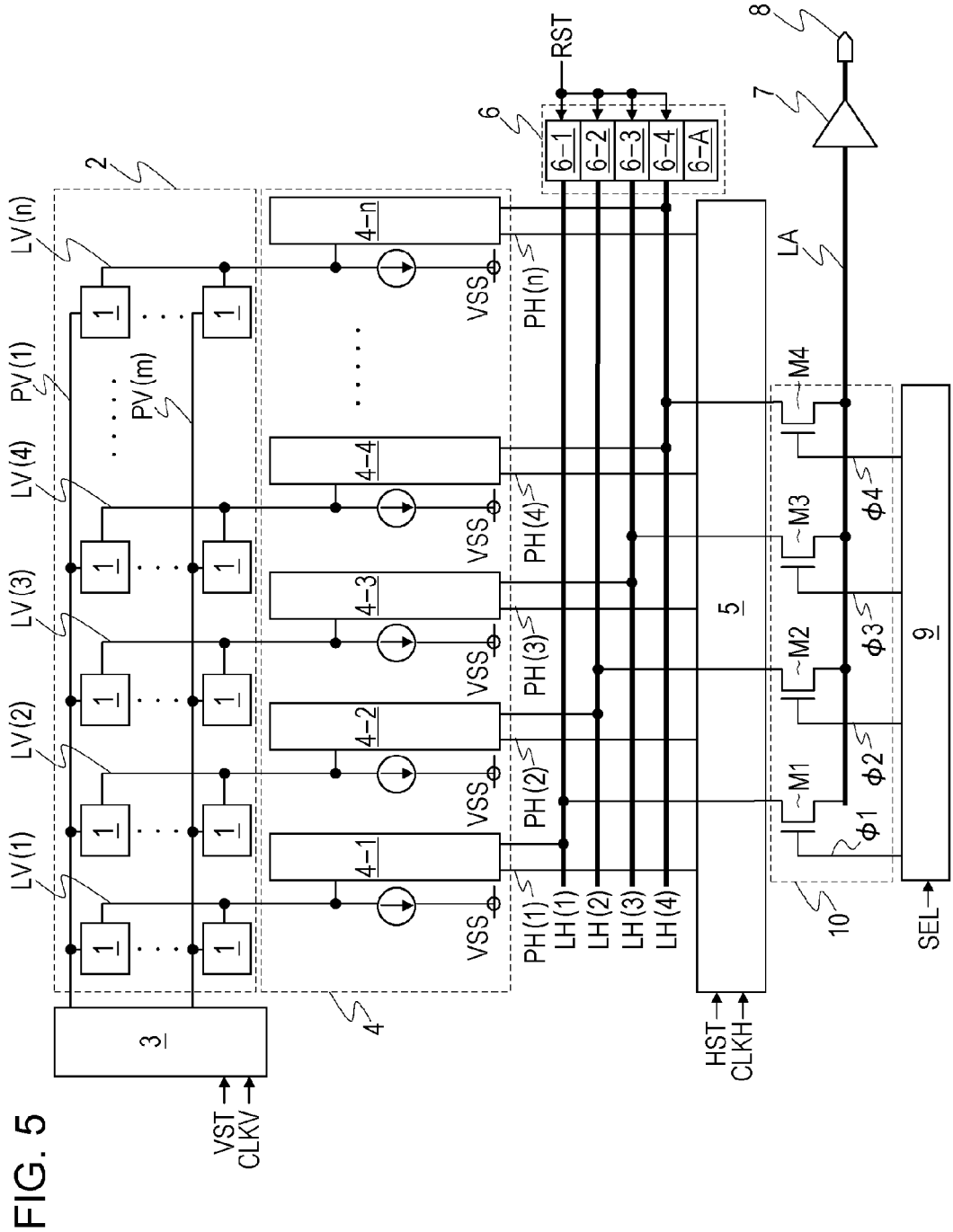
FIG. 5 is a block diagram illustrating a configuration example of a photoelectric converter according to a second embodiment.

FIG. 5 is a block diagram illustrating a configuration of a photoelectric converter according to a second embodiment of the present invention. Description here will be made primarily regarding points which are different from the first embodiment.

While description has been made of the first embodiment regarding an arrangement where all column signal processing units 4-1 through 4-n are connected to a single horizontal signal line LH, the present embodiment differs from this in that four horizontal signal lines LH(1), LH(2, LH(3), and LH(4) are provided. The present embodiment also differs in that the four horizontal signal lines LH(1) through LH(4) are connected to a common horizontal signal line LA via a multiplexer 10. The photoelectric converter according to the present embodiment further includes a multiplexer control circuit 9 for controlling the operations of the multiplexer 10.

A number n of column signal processing units are connected to the four horizontal signal lines LH(1), LH(2), LH(3), and LH(4) in cycles of four. Specifically, column signal processing units 4-1, 4-5, 4-9, . . . are connected to the horizontal signal line LH(1). According to this configuration, the parasitic capacitance associated with the horizontal signal lines LH(n) and LA is reduced, yielding an advantage of a higher readout rate of signals.

In the present embodiment, reset units 6-1 through 6-4 and 6-A may be provided corresponding to each of the horizontal signal lines LH(1) through LH(4) and LA, or a reset unit may be provided which resets all horizontal signal lines in common.

Figure 6:
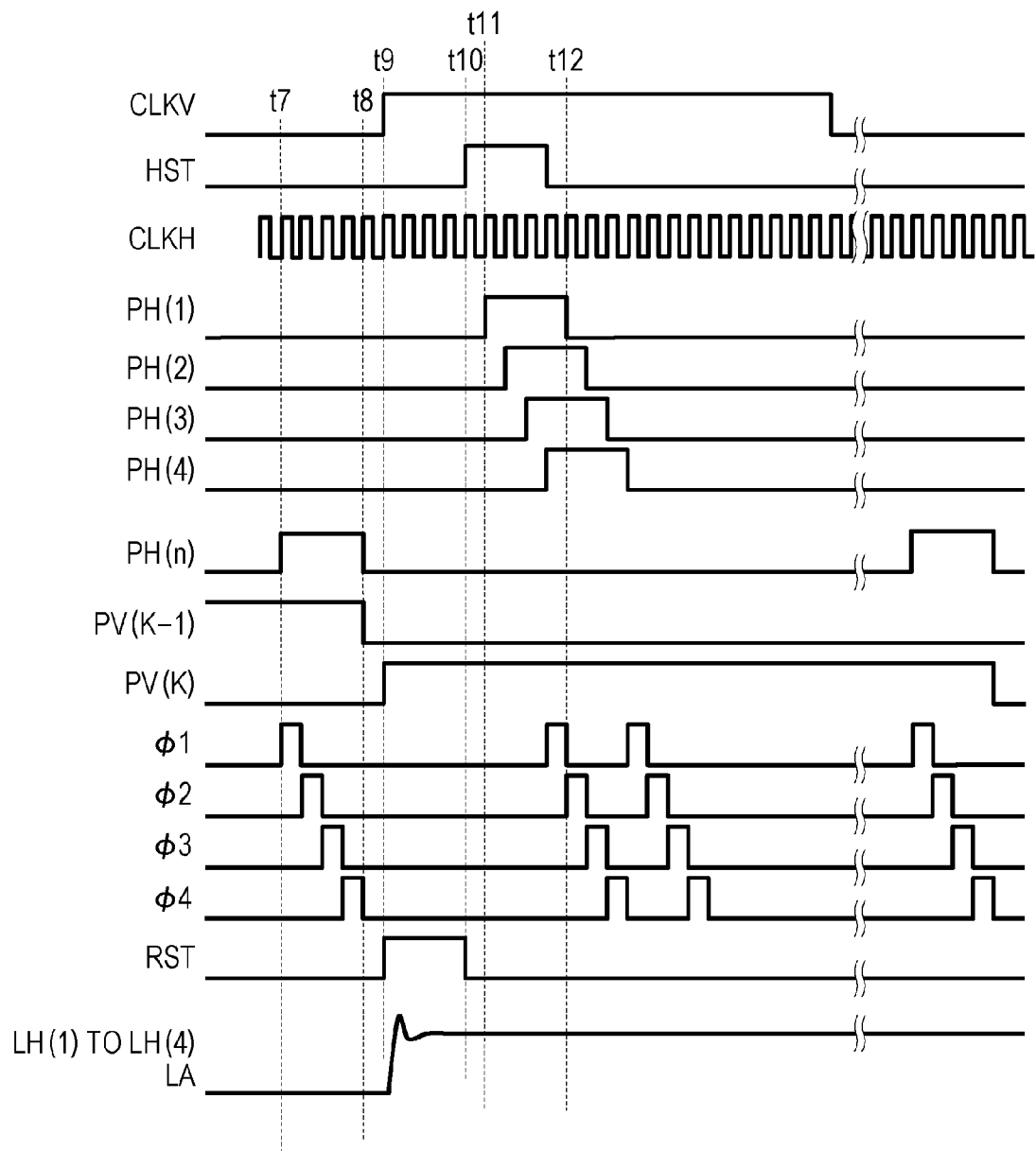
FIG. 6 is a timing chart for describing operations of the photoelectric converter according to the second embodiment.

FIG. 6 is a timing chart for describing operations relating to the present embodiment. Time t7 to time t8 in FIG. 6 is a period of reading out signals relating to pixels in the (K−1)'th row of the pixel array 2. Time t9 and thereafter is a period of reading out signals relating to pixels in the K'th row of the pixel array 2.

Upon the signal PH(n) going to high level at time t7, signal φ1 through signal φ4 sequentially go to high level, synchronously with the rising edge of the horizontal clock signal CLKH. Accordingly, the signals output to the horizontal signal lines LH(1) through LH(4) are sequentially manifested on the horizontal signal line LA and are output via the output buffer 7.

At time t8, the signal PH(n) and the signal PV(K−1) go to low level.

Upon the signal CLKV going to high level at time t9, the vertical start pulse VST shifts to the next stage, and the signal PV(K) goes to high level. Thus, the pixels of the K'th row of the pixel array 2 are selected.

Upon the signal RST going to high level at time t9, the horizontal signal lines LH(1) through LH(4) and LA are reset to the reset level. The reset voltage VRST is set such that the absolute value between the reset voltage VRST and the first voltage VCC is smaller than the absolute value between the reset voltage VRST and the second voltage VSS in the present embodiment as well, so signals can be accurately read out from the signal processing unit 4.

At time t10, the signal RST goes to low level, and the horizontal start pulse HST goes to high level.

From time t11 on, the signals PH(1), PH(2), . . . , PH(n) sequentially go to high level, synchronously with the rising edge of the horizontal clock signals CLKH. In the same way as the horizontal start pulse HST, the signals PH(1), PH(2), . . . , PH(n) have a length of four cycles worth of the horizontal clock signal CLKH. During the period where each of the signals PH(1), PH(2), . . . , PH(n) is at high level, one of the signals φ1 through φ4 go to high level synchronously with the rising edge of the fourth clock of the horizontal clock signal CLKH. The above-described operations complete the readout operation of signals relating to pixels of the K'th row.

Comparing the operations according to the present embodiment with the operations according to the first embodiment, the pulse of the signal PH(n) is longer in the present embodiment. The reason is that four cycles of column signal processing units are connected to the horizontal signal lines LH(1) through LH(4), and accordingly sufficiently long time of charge/discharge can be afforded for the horizontal signal lines to which the column signal processing units correspond. Being able to afford sufficient time for stabilization of the potential of the horizontal signal lines LH(1) through LH(4) yields the advantage that the signals can be accurately read out.

While description has been made in the present embodiment regarding an example of a configuration having four horizontal signal lines LH(1) through LH(4), the number of horizontal signal lines is not restricted to four.

Third Embodiment

A multi-chip photoelectric converter according to a third embodiment of the present invention will be described. An arrangement will be considered here where three chips, upon each of which a photoelectric converter has been formed, are arrayed two-dimensionally (so are arrayed side-by-side in a single row). Two-dimensionally arraying multiple photoelectric converters enables the imaging region to be enlarged. The present invention is also effective in cases of application to such multi-chip photoelectric converters.

Figure 7A:
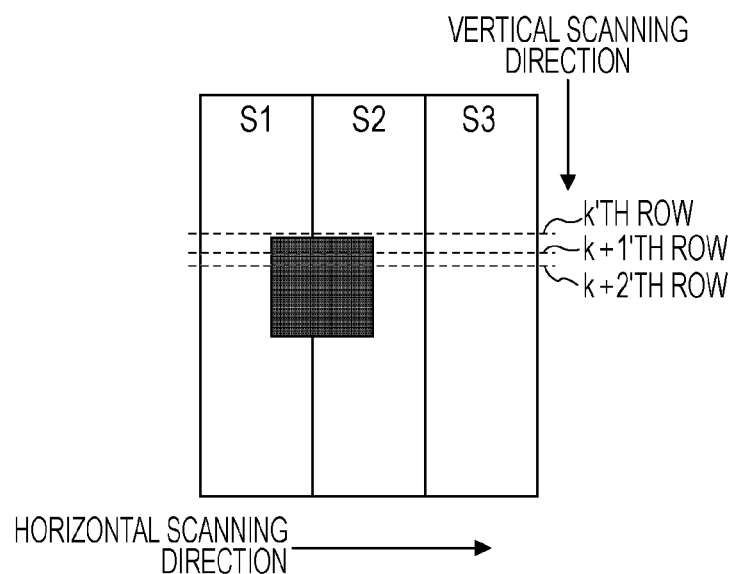
FIGS. 7A and 7B are diagrams illustrating a configuration example of a multi-chip photoelectric converter according to a third embodiment.

FIG. 7A is a schematic diagram illustrating the multi-chip photoelectric converter according to the present embodiment. In FIG. 7A, chips s1, S2, and S3 each include individual semiconductor substrates, with the photoelectric converter described in the above embodiments formed upon each. Scanning of lines is performed from the top of the diagram toward the bottom, and scanning of columns is performed from the left of the diagram toward the right. The multiple photoelectric converters making up the multi-chip photoelectric converter may operate in parallel.

Figure 7B:
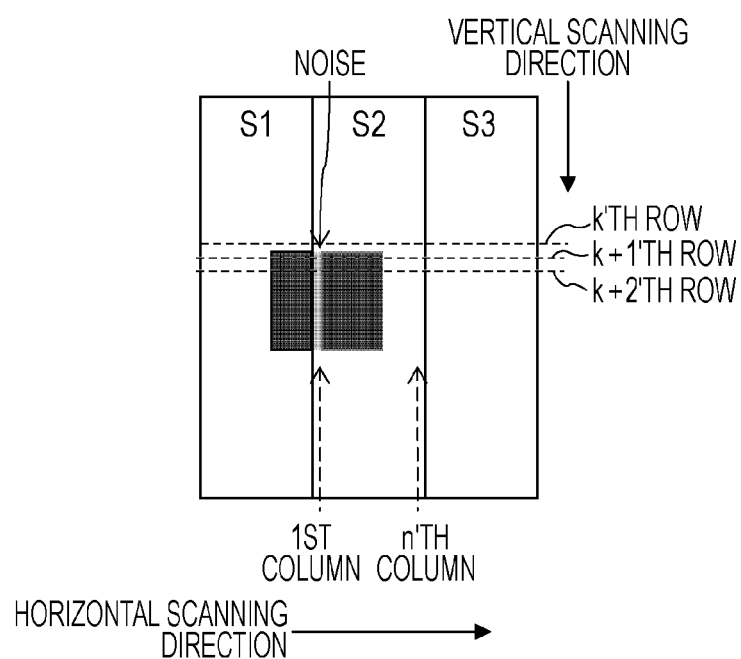

An assumption will be made that the multi-chip photoelectric converter images a subject which is black at a region straddling chips S1 and S2, and the other regions are white. In FIGS. 7A and 7B, the k'th row is a white region, while the (k+1)'th region partially includes the black region. According to the photoelectric converters described in the embodiments above, image deterioration can be suppressed even when starting to read out signals from the pixels of the (k+1)'th row after having read out signals from the pixels of the k'th row. The reason will be described below.

For example, at chip S2 the last pixel to be read out from the pixels of the k'th row is white, so a voltage signal close to saturation level is output to the horizontal signal line LH. That is to say, a signal of a value close to the second voltage VSS in the configuration illustrated in FIG. 1. However, the first pixel to be read out from the pixels of the (k+1)'th row of chip S2 is black, so a signal of a value close to the first voltage VCC in the configuration illustrated in FIG. 1 is output to the horizontal signal line LH. Accordingly, there has been concern that the potential of the horizontal signal line LH would widely fluctuate in a conventional photoelectric converter. As a result, there has been the concern that the signal read out from the pixel in the first column of the (k+1)'th row might be displayed as gray and not black when displayed as an image, as illustrated in FIG. 7B. The pixel of the first column is also manifested as gray in the (k+2)'th and subsequent rows, resulting in streak-like noise.

However, according to the present embodiment, the horizontal signal lines are reset at a reset level closer to the first voltage than the second voltage, before reading out signals from the pixels of the (k+1)'th row, so problems which could occur in conventional photoelectric converters can be reduced.

Fourth Embodiment

Figure 8:
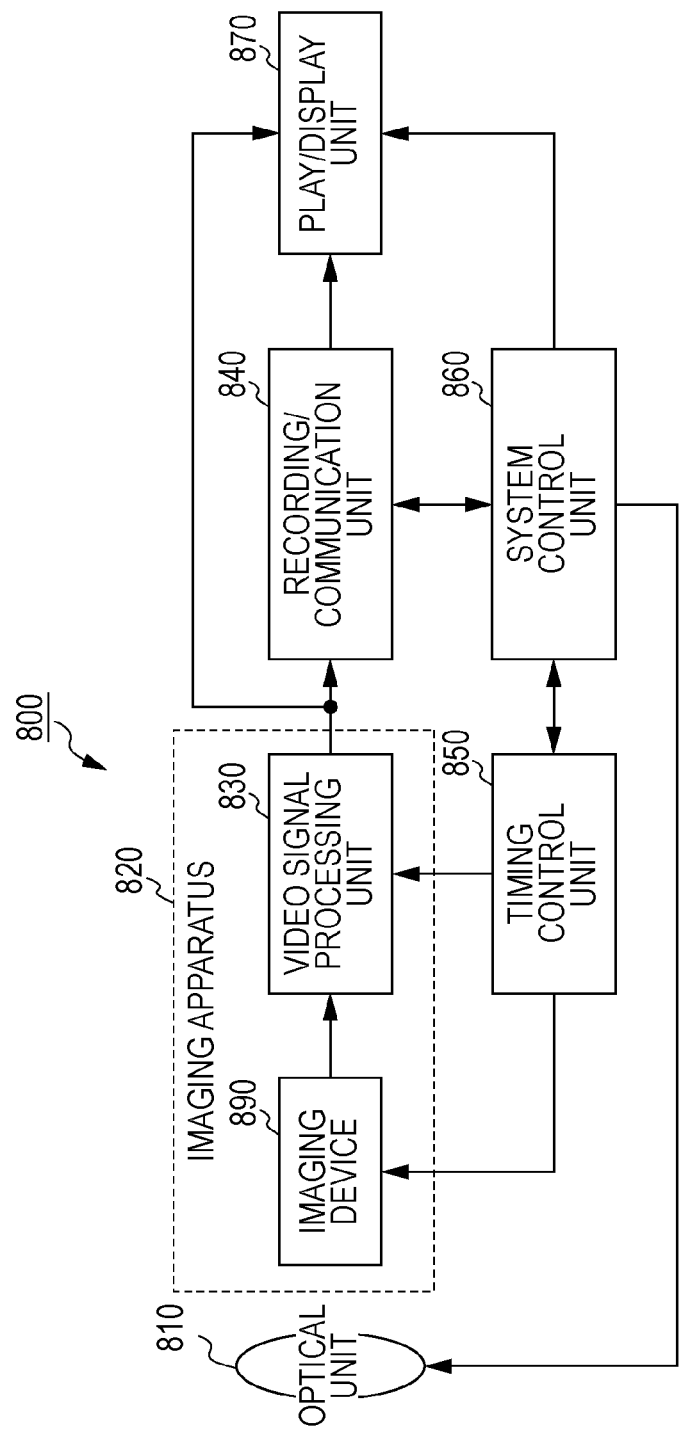
FIG. 8 is a diagram illustrating a configuration example of an imaging system according to a fourth embodiment.

FIG. 8 is a diagram illustrating a configuration example of an imaging system according to a fourth embodiment of the present invention. The imaging system 800 includes, for example, an optical unit 810, an imaging device 890, a video signal processing unit 830, a recording/communication unit 840, a timing control unit 850, a system control unit 860, and a play/display unit 870. An imaging apparatus 820 includes the imaging device 890 and video signal processing unit 830. A photoelectric converter or multi-chip photoelectric converter described in the above embodiments is used as the imaging device 890.

The optical unit 810, which is an optical system comprising lens(es) and the like focuses light from a subject on a pixel unit PA of the imaging device 890 where multiple pixels are arrayed in a two-dimensional form, thereby forming an image of the subject. The imaging device 890 outputs signals according to light focused on the pixel unit PA, at a timing based on signals from the timing control unit 850. The signals output from the imaging device 890 are input to the video signal processing unit 830 which processes video signals, and the video signal processing unit 830 performs signal processing following a method stipulated by a program or the like. Signals obtained by the processing at the video signal processing unit 830 are sent to the recording/communication unit 840 as image data. The recording/communication unit 840 sends signals to form an image to the play/display unit 870, so that the play/display unit 870 plays/displays moving images and still images. The recording/communication unit 840 also communicates with the system control unit 860 upon having received signals from the video signal processing unit 830, and also performs operations to record the signals to form images in a recording medium which is omitted from illustration.

The system control unit 860 centrally controls the operations of the imaging system, and controls driving of the optical unit 810, timing control unit 850, recording/communication unit 840, and play/display unit 870. The system control unit 860 also has a storage device, omitted from illustration, which is a recording medium for example, where programs and the like necessary for controlling the operations of the imaging system are stored. The system control unit 860 also supplies signals for switching driving modes within the imaging system, in accordance with user operations, for example. Specific examples include changing a row for readout or a row for resetting, changing the field angle due to electronic zooming, shifting the field angle due to an electronic image stabilizing function, and so forth. The timing control unit 850 controls the driving timing of the imaging device 890 and the video signal processing unit 830 based on control by the system control unit 860.

A configuration may be made having a wavelength conversion member which converts the wavelength of incident light, as the optical unit 810. One example is a wavelength conversion member which outputs visible light when X-rays are input as incident light. The imaging device 890 generates signals based on the incident light of which the wavelength has been converted by the wavelength conversion member. According to this configuration, an imaging system can be configured which serves as an X-ray imaging apparatus. The imaging system may also include an X-ray generating apparatus serving as a light source which generates X-rays.

The above-described embodiments are only exemplary. For example, the signal source is not restricted to a source follower circuit, and may be a circuit of another format. It is sufficient that the configuration has an amplifying transistor and load provided serially between the first node and the second node, such as in a common source amplification circuit, a voltage follower, for example, or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-086686, filed Apr. 18, 2014, which is hereby incorporated by reference herein in its entirety.

What is claimed is:
1. A photoelectric converter comprising:
a signal source processing a signal generated at a photoelectric conversion unit;
a signal line configured to receive signals output from the signal source; and a resetting unit configured to supply a reset voltage to the signal line,
wherein the signal source includes an amplifying transistor and a load which supplies current to the amplifying transistor, that are serially arrayed between a first node to which a first voltage is supplied and a second node to which a second voltage is supplied,
wherein the load is disposed at a side where the second voltage is supplied,
and wherein an absolute value of a difference between the reset voltage and the first voltage is smaller than an absolute value of a difference between the reset voltage and the second voltage.

2. The photoelectric converter according to claim 1, wherein the load is a current source,
and wherein the amplifying transistor and the current source configure a source follower circuit.

3. The photoelectric converter according to claim 1, wherein the resetting unit resets the signal line prior to operations of the signal source outputting signals to corresponding signal lines.

4. A multi-chip photoelectric converter, having a plurality of semiconductor substrates, upon each of which is provided the photoelectric converter according to claim 1.

5. An imaging system comprising:
the photoelectric converter according to claim 1; and
a video signal processing unit configured to generate image data by processing signals output from the photoelectric converter.

6. The imaging system according to claim 5, further comprising:
a light source configured to generate X-rays.

7. The imaging system according to claim 5, further comprising:
a wavelength conversion member configured to convert the wavelength of X-rays irradiated from an X-ray source.

8. The photoelectric converter according to claim 1, wherein the photoelectric converter comprises a plurality of signal sources.

9. The photoelectric converter according to claim 8, wherein the photoelectric converter comprises a plurality of signal lines and a plurality of signal sources,
wherein a at least one of the signal sources is connected to a first signal line of the plurality of signal lines,
and wherein at least one other signal source is connected to a second signal line of the plurality of signal lines.

10. The photoelectric converter according to claim 9, wherein the plurality of signal sources are arrayed one-dimensionally,
wherein the number of the plurality of signal lines is m,
and wherein every m'th signal source of the plurality of signal sources arrayed one-dimensionally is connected to the same one of the m signal lines.

11. A driving method of a photoelectric converter, having a signal source processing a signal generated at a photoelectric conversion unit including
a photoelectric conversion unit,
an amplifying transistor, and
a load that supplies current to the amplifying transistor,
in which the amplifying transistor and load are serially arrayed between a first node to which a first voltage is supplied and a second node to which a second voltage is supplied, the load being disposed at a side where the second voltage is supplied, and
a signal line configured to receive signals output from the signal source,
the method comprising:
resetting the signal line to a reset voltage prior to outputting signals to the signal line from the signal source,
wherein an absolute value of a difference between the reset voltage and the first voltage is smaller than an absolute value of a difference between the reset voltage and the second voltage.

* * * * *